United States Patent
Kambhatla

(10) Patent No.: US 10,528,315 B2
(45) Date of Patent: Jan. 7, 2020

(54) IMPLEMENTING WIRELESS DISPLAYS THAT HANDLE ROTATION AND/OR PORTRAIT-FIRST SINKS

(71) Applicant: Intel Corporation, Santa Clara, CA (US)

(72) Inventor: Srikanth Kambhatla, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 14/865,469

(22) Filed: Sep. 25, 2015

(65) Prior Publication Data

US 2017/0090847 A1 Mar. 30, 2017

(51) Int. Cl.
| | | |
|---|---|---|
| *H04W 88/02* | (2009.01) | |
| *G06F 3/14* | (2006.01) | |
| *G06F 1/16* | (2006.01) | |
| *G06T 3/40* | (2006.01) | |
| *G06T 3/60* | (2006.01) | |

(52) U.S. Cl.
CPC .......... *G06F 3/1431* (2013.01); *G06F 1/1626* (2013.01); *G06F 3/1454* (2013.01); *G06T 3/40* (2013.01); *G06T 3/4092* (2013.01); *G06T 3/60* (2013.01); *G09G 2340/0442* (2013.01); *G09G 2340/0492* (2013.01); *G09G 2370/042* (2013.01); *G09G 2370/16* (2013.01)

(58) Field of Classification Search
CPC ....... G06F 1/1626; G06F 3/012; H04L 41/22; H04L 67/1095; H04N 21/2343; G06T 3/40
USPC ............ 455/557; 709/201; 715/736; 725/62; 345/156; 348/581
See application file for complete search history.

(56) References Cited

U.S. PATENT DOCUMENTS

| | | | |
|---|---|---|---|
| 7,629,987 B1 | 12/2009 | De Waal | |
| 8,010,702 B2 | 8/2011 | Farouk | |
| 2004/0083291 A1 | 4/2004 | Pessi et al. | |
| 2006/0026513 A1 | 2/2006 | Eschbach et al. | |
| 2011/0298982 A1* | 12/2011 | Kobayashi | G06T 3/40 348/581 |
| 2012/0040719 A1* | 2/2012 | Lee | G06F 1/1626 455/557 |
| 2014/0040959 A1 | 2/2014 | Oyman | |
| 2014/0062860 A1* | 3/2014 | Lee | G06F 3/012 345/156 |
| 2014/0173446 A1* | 6/2014 | Lee | H04L 41/22 715/736 |
| 2014/0358981 A1* | 12/2014 | Miyake | H04L 67/1095 709/201 |
| 2015/0256861 A1* | 9/2015 | Oyman | H04N 21/2343 725/62 |

OTHER PUBLICATIONS

PCT Search Report and Written Opinion dated Dec. 15, 2016 in corresponding PCT/US2016/048621 (16 pages).

* cited by examiner

*Primary Examiner* — Abdul-Samad A Adediran
(74) *Attorney, Agent, or Firm* — Trop, Pruner & Hu, P.C.

(57) ABSTRACT

Rotation between landscape and portrait modes or vice versa may be supported in wireless display interfaces coupled to a platform by having the platform sense rotation change in the platform or in the display. This enables counter rotation of the frame buffer or rotated rendering of the content to ensure that content is presented upright to the end user.

21 Claims, 4 Drawing Sheets

IMPLEMENTING WIRELESS DISPLAYS THAT HANDLE ROTATION AND/OR PORTRAIT-FIRST SINKS

BACKGROUND

This relates generally to wireless displays.

Wireless display technology generally involves a source which transmits data for display on a sink such as a monitor or display device. Most sinks today only work in the landscape or sideways mode. Current wireless specifications have tended to not address the rotation problem explicitly.

In fact, version 1.1 of the WiFi Display Technical Specification (2012) (available from Wi-Fi Alliance) only allows for landscape mode (landscape first mode) to be transmitted over the air in all scenarios and rotation is largely ignored. Several scenarios have come up that require a more explicit definition: 1) Portrait-first displays (displays that scan content in portrait order) are increasingly common, 2) Sink devices allow for windowed or docked mode of operation i.e., device orientation could be different than content orientation, 3) a single Source could be transmitting content to more than one Sink—and some of the Sinks could be rotated while others are not, 4) the Source itself could be rotated, 5) content in the Source could have either Landscape or Portrait orientation, and 6) many of the Sinks (e.g., TVs, or notebook computers or tablet devices) have Graphics Processing Units (GPUs) in them that allow them to transform received content if the framework allows it.

A naïve implementation could result in source content being aspect ratio scaled twice. It may be scaled once for a landscape presentation and then another time for a portrait presentation, resulting in suboptimal output at the display.

BRIEF DESCRIPTION OF THE DRAWINGS

Some embodiments are described with respect to the following figures.

DETAILED DESCRIPTION

Rotation between landscape and portrait modes or vice versa may be supported in wireless display interfaces coupled to a platform by having the platform sense rotation change in the platform or in the display. This enables counter rotation of the frame buffer or rotated rendering of the content to ensure that content is presented upright to the end user.

A source is a device that supports streaming multimedia content over a wireless link to a sink. A sink is a device that receives and renders multimedia content from a source over a wireless link. Rendering is the process of generating an image or sound. A source may be any processor based device including a personal computer, a cellular telephone, a set-top box or a game console as examples. The sink may include a display or monitor to display images and/or play sounds. The sink may be a processor based device such as a tablet that docks (i.e. connects to) to the source which acts as a host, for example.

Figure 1:
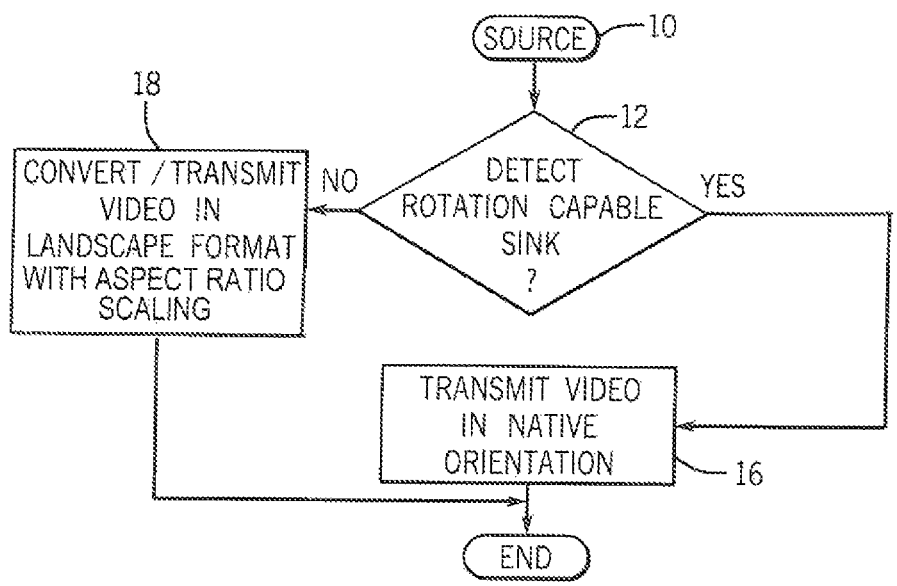
FIG. 1 is a flow chart for source implemented sequence according to one embodiment.

Thus, referring to FIG. 1, a sequence in a source 10 may be implemented in software, firmware and/or hardware. In software and firmware embodiments it may be implemented by computer executed instructions stored in one or more non-transitory computer readable media such as magnetic, optical or semiconductor storage. Content typically in software and firmware embodiments, a sequence may be implemented in a storage associated with a host or platform based central processing unit.

The sequence 10, shown in FIG. 1 begins by detecting a rotation-capable sink as indicated at block 12. Rotation is an optional sink feature in some embodiments. If a sink does not support rotation, then all transmissions from the source are in landscape orientation. A rotation-capable sink may be identified by a parameter that indicates support for the rotation feature, in one embodiment. A parameter value of "supported" implies that the sink is capable of receiving contents of portrait or landscape buffers and has the ability to perform rotation and/or aspect ratio scaling to present the content in appropriate manner.

A source may query the sink's rotation capability as part of capability discovery phase of the wireless display protocol. For example, this could in an M3 request and sent in the same M3 request as the video-formats, in an embodiment following the Wi-Fi Display Technical Specification (Version 1.1); the sink's rotation capability is queried during initial real time streaming protocol (RTSP) capability exchange. A sink that does not support rotation returns a parameter value of "none." Non-compliant sinks may ignore the rotation capability request entirely.

An RTSP M3 message occurs after sending an RTSP M2 response including a status code of RTSP OK to the sink. See Wi-Fi Display Specification at 6.4.3. The source sends an RTSP M3 request to the sink to query the sink's attributes and capabilities. The M3 request contains an RTSP GET_PARAMETER request. The parameters that may be requested initially include a rotation capability in one embodiment. The sink responds to the M3 message indicating an appropriate status code. If the M3 response message contains a status code of RTSP OK, the RTSP M3 response contains the values of the requested parameters.

A Source could simultaneously be transmitting content to its local integrated display, and to one or more sink devices connected wirelessly or through wired interfaces. In order to present content to the local integrated display or to any wired displays that might be attached and active, the Source performs appropriate counter-rotation and aspect ratio scaling based on detection of current orientation of these displays. These transformations are independent of what the Source would target for the Sink devices connected wirelessly. The latter is always in the native resolution of the content unless there is insufficient bandwidth to transmit the content—even after any compression scheme permitted under the wireless display standard; in such cases, the Source will downscale the content (maintaining its aspect ratio) before compression.

If the source detects a rotation capable wireless sink at diamond 12, it does not perform any transformation of the content and transmits the content in its native or original orientation as indicated in block 14.

On the other hand, if the wireless sink is not detected to be rotation capable at diamond 12, the video is transmitted as landscape content with appropriate aspect ratio scaling as shown at block 18. Thus, where the Source video was in portrait mode, it would be converted to landscape mode after pillar-boxing before transmission and if it was already in landscape mode, it is simply transmitted.

Figure 2:
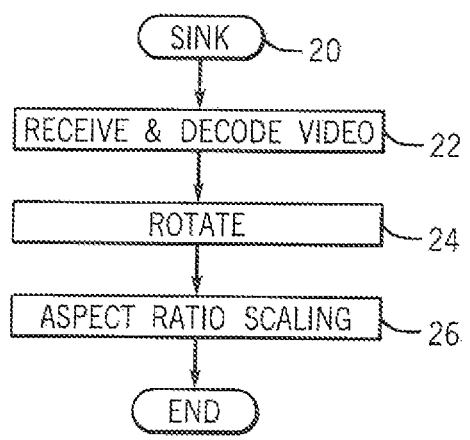
FIG. 2 is a flow chart for a sink implemented sequence according to one embodiment.

Referring to FIG. 2, a sink-based sequence 20 may be implemented in software, firmware and/or hardware. In software and firmware embodiments it may be implemented by computer executed instructions stored in one or more non-transitory computer readable media such as magnetic, optical or semiconductor storage.

Figure 3:
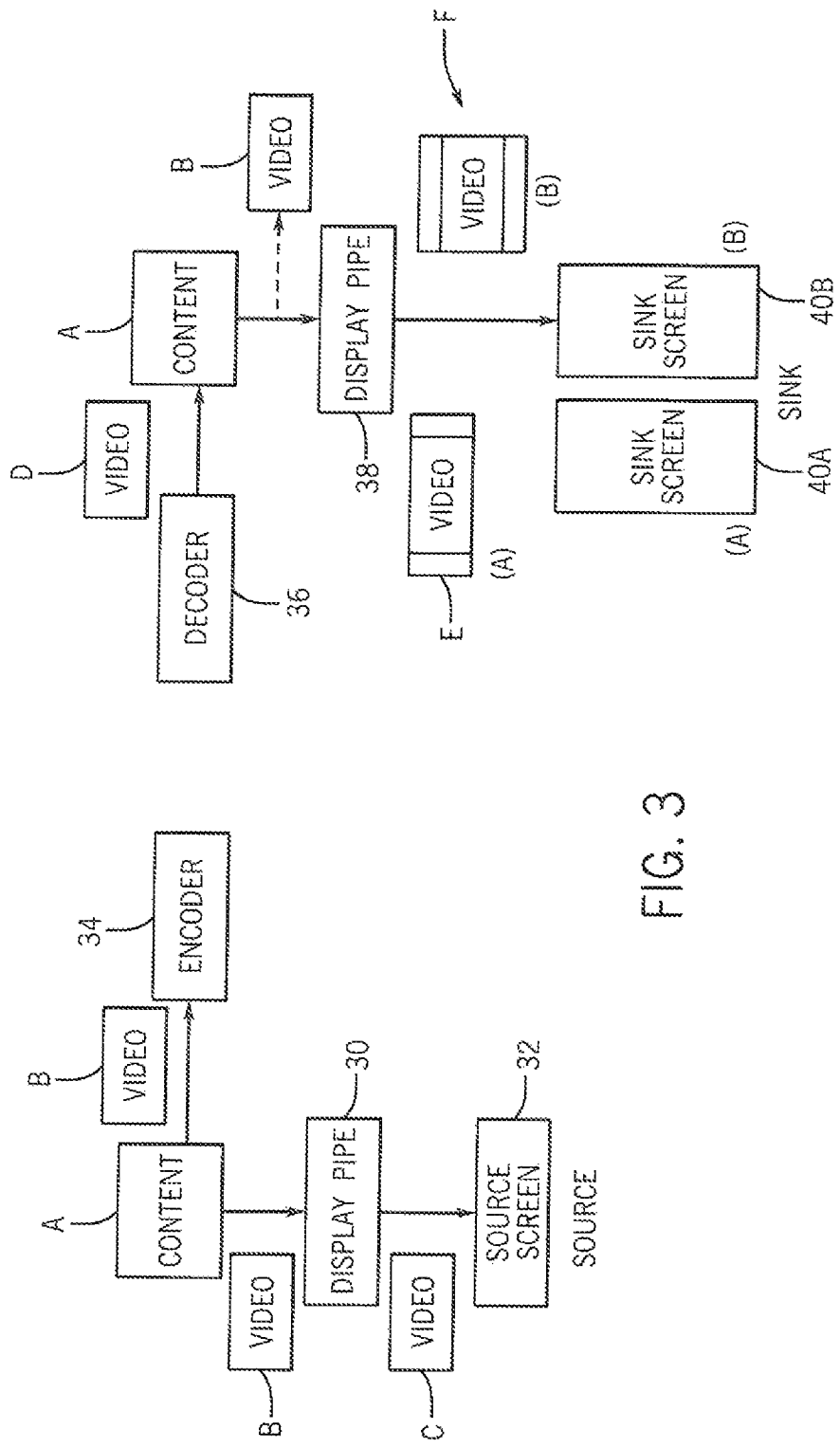
FIG. 3 is a schematic depiction showing how landscape oriented content can be handled by a source on the left and a sink on the right according to one embodiment.
Figure 4:
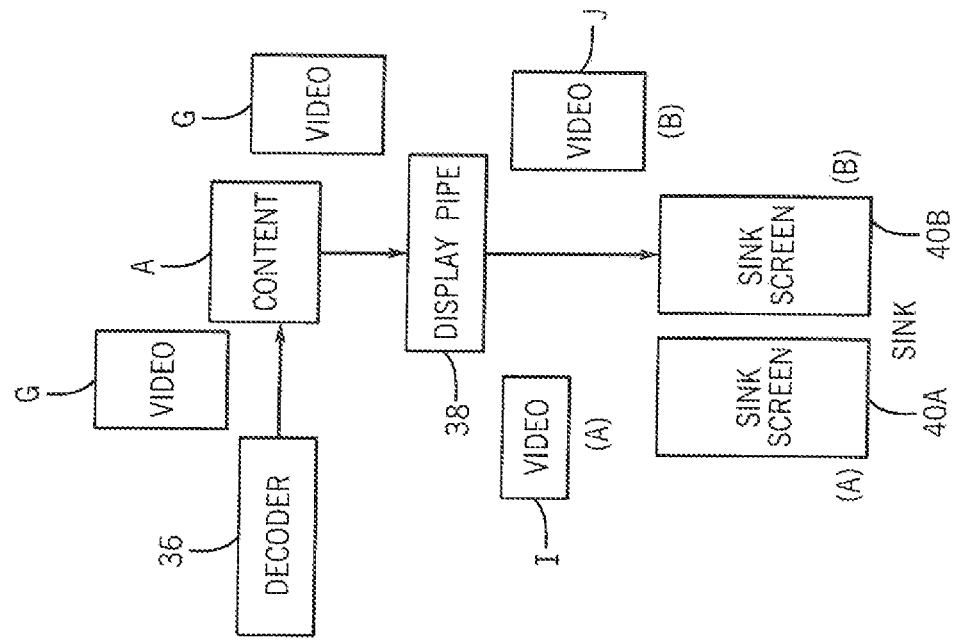
FIG. 4 is a schematic depiction of how portrait oriented content can be handled with a source on the left and a sink on the right according to one embodiment.
Figure 4:
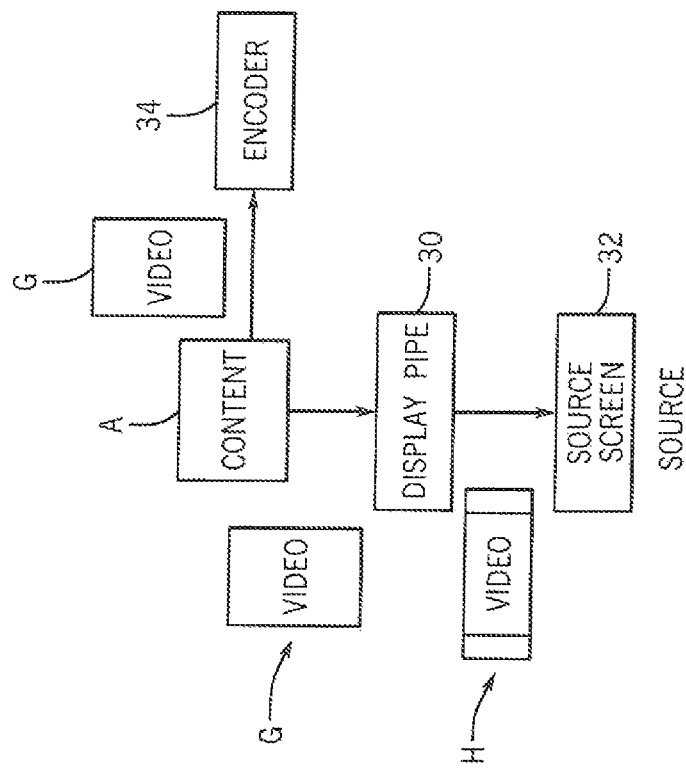
Figure 5:
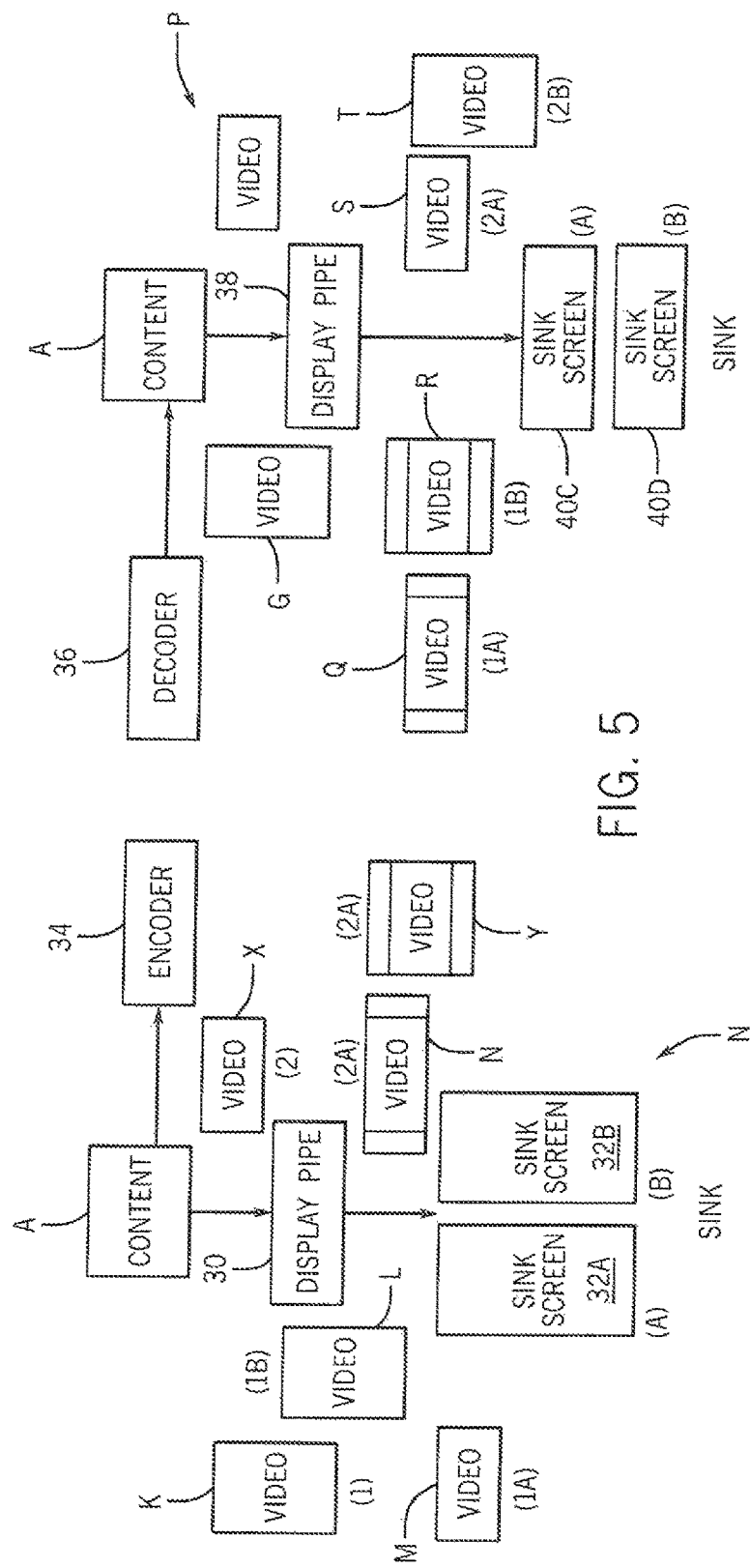
FIG. 5 is a schematic depiction of how rotated portrait source to landscape rotate at the sink according to one embodiment.

The sink-based sequence 20 begins by receiving and decoding video from the source as indicated in block 22. Then if possible, the sink rotates the content to either the landscape or portrait mode as appropriate for the sink, as indicated in block 24. Finally, aspect ratio scaling is implemented as indicated in block 26. It involves scaling the content to the desired size, such as full screen, window size or some other size while maintaining the aspect ratio of the content. This may involve introduction of black borders next to the content in a combination of letter boxing or pillar boxing formats depending on the aspect ratio of the content and dimensions of the display window. In the following discussion, to further illustrate the concepts described herein, three scenarios are depicted in FIGS. 3, 4 and 5. The source is shown on the left in FIG. 3 and the sink is shown on the right in FIGS. 3-5.

In the first scenario, shown in FIG. 3, landscape oriented content A is presented on the landscape source and on a portrait-first or a rotated landscape sink. A rotated landscape display is a landscape display rotated 90° (it could also be 270 degrees, and that case is handled in a similar manner). The source performs aspect ratio scaling in display/presentation pipeline 30 (for the source's own display, not for the sink's display) but does not perform any rotation before display of video C on source screen 32. Given wireless display protocols usually include an encoder block, the Source device encodes, (in encoder 34), the content A in the content's native (landscape) orientation B and its native size (i.e. without scaling).

The sink decodes a landscape buffer in decoder 36. If the sink has a rotated landscape display (case a) and wishes to show the received content A full screen, it performs aspect ratio scaling and rotation in display pipe 38 before presenting the docked video E on landscape screen 40a. However, if the sink has a portrait-first display (case b) and wishes to show the received content full screen, it only performs aspect ratio scaling of the docked video F for sink portrait-first screen 40b.

The second scenario, shown in FIG. 4, involves portrait content in the above (FIG. 3). In FIG. 4, the source performs aspect ratio scaling in display pipe 30 (for its own display only) topology but does not perform any rotation before display of docked video H on source screen 32. It encodes the content A in the content's native (portrait) orientation G and at its native resolution, in encoder 34.

The sink decodes a portrait buffer in decoder 36 to produce video G. If the sink has a rotated landscape display (case a) and wishes to show the received content full screen, it performs aspect ratio scaling and rotation in display pipe 38 before presenting the video I on landscape sink screen 40a. And if the sink has a portrait-first display (case b) and wishes to show the received content full screen, it only performs aspect ratio scaling of video J for portrait sink screen 40b.

In the third scenario, rotated landscape/portrait source to rotated portrait/landscape sink operation is illustrated in FIG. 5. FIG. 5 shows the way that landscape and portrait content is handled both at the source and at the sink.

Beginning with the source, the content A at the source is in portrait mode K. In option a, the local monitor 32a at the source is rotated landscape and in option b, the local monitor 32b at the source is portrait. Thus, the source rotates and aspect ratio scales the video K to video M in display pipe 30 for the rotated landscape monitor in case a. In case b, the source only performs aspect ratio scaling to video L in display pipe 30 for a portrait monitor 32b.

If the content in the source is in instead in landscape mode X, in case a, the source performs rotation and aspect ratio scaling to create docked video N for the rotated landscape monitor 32a. In case b, the source performs aspect ratio scaling to docked video Y for the portrait monitor 32b.

With respect to the sink, in case a, the sink monitor 40c is landscape and in case b the sink monitor 40d is rotated portrait.

The sink receives the content A in its native orientation and resolution, either portrait G or landscape P. At 1A, the sink performs aspect ratio scaling of the received portrait content to create docked video Q. At 1B, the sink performs rotation and aspect ratio scaling of the received content to produce docked video R. At 2A, the sink performs aspect ratio scaling of the received landscape contents to produce video S. At 2B, the sink performs rotation and aspect ratio scaling of the received portrait content to provide video T.

In each case described above, a rotated wireless sink and/or portrait—first wireless sink is supported without any notification or status updates for the sink's current orientation. In some embodiments, the source does not perform any rotation or aspect ratio scaling for the sink. The sink can show source content in windowed or docked (i.e. displayed within a landscape screen in smaller portrait mode or with a portrait screen in smaller landscape mode) fashion without artifacts, and regardless of orientation of source or sink. In some embodiments the above operation is activated regardless of whether the source's content is landscape or portrait oriented. Scaling twice (once in the source and once in the sink, both for the sink display) is advantageously avoided in some embodiments.

In some embodiments, the Sink could determine the destination window size (which could be full screen) based on Sink specific mechanisms such as user input through on-screen display (OSD), remote, (in the case of a personal computer (PC) Sink) desktop user interface (UI), or through Sink-specific policies. For example, a particular Sink could have a policy to always show the received content full screen, while another Sink could always start by showing all received content in a window of a default size until such time as a user changes it to full screen or some other size. Similarly, default policies on a notebook computer, a tablet device, or a game console (when these are Sink devices) could be determined by such factors as current orientation of the device, application that is receiving the content, or user settings on that device.

When connected to a rotation capable sink, the source encodes macroblocks left to right both for landscape and portrait content in one embodiment.

A source may need to downscale the content before encoding if the resolution of the content is greater than the maximum resolution capability of the source or sink.

It is also possible that the content may be changing its orientation dynamically. One example involves starting of a portrait video stream after transmission of landscape video. The decoder can determine current resolution, and therefore orientation, of the video stream through metadata that is part of the encoded bitstream. However, if the wireless display specification requires, an alternative explicit notification to the sink for resolution change, that requirement may also apply here.

Some embodiments may apply conventional display technologies including the Wi-Fi Display Technical Specification, the WiGig Display Extension (WDE), Wireless Graphics Alliance (Version 1.1), or other wireless display technologies.

While a single source and a single sink are shown here, multiple sources and sinks may be coupled wirelessly in some embodiments. In scenarios where a given Source is streaming content to multiple Sinks, each Sink could make its own choice on how to display the same received content without the Source having to perform multiple transformations and consequently transmitting the same logical content multiple times.

The following clauses and/or examples pertain to further embodiments:

One example embodiment may be a method of transmitting video wirelessly from a source comprising detecting a rotation capable sink, in response to detecting a rotation capable sink, wirelessly transmitting video content in the content's native orientation, and in response to detecting a sink that is not rotation capable, wirelessly transmitting video content in landscape orientation. The method may also include wherein detecting includes obtaining a parameter from the sink indicative of whether the sink is rotation capable. The method may also include detecting using an M3 request. The method may also include rotating received content and aspect ratio scaling content for display on the source. The method may also include supporting a rotated wireless sink without notifications or status updates related to the sink's current orientation. The method may also include wherein no rotation or aspect ratio scaling is performed by the source for the sink. The method may also include refraining from scaling video sent for display on a sink.

Another example embodiment may be a method of wirelessly receiving video in a sink comprising decoding received video, performing rotation of the received video, and performing aspect ratio scaling of the received video. The method may also include receiving a request from a source for a rotation capability. The method may also include responding to the request by indicating whether the sink supports rotation.

In another example embodiment an apparatus comprising a processor to detect a rotation capable sink, in response to detecting a rotation capable sink, wirelessly transmit video content in the content's native orientation, and in response to detecting a sink that is not rotation capable, wirelessly transmitting video content in landscape orientation, and a transmitter coupled to said processor. The apparatus may include said processor to detect by obtaining a parameter from the sink indicative of whether the sink is rotation capable. The apparatus may include said processor to detect using an M3 request. The apparatus may include said processor to rotate received content and aspect ratio scaling content for display on the source. The apparatus may include said processor to support a rotated wireless sink without notifications or status updates related to the sink's current orientation. The apparatus may include wherein no rotation or aspect ratio scaling is performed by the source for the sink. The apparatus may include said processor to refrain from scaling video sent for display on a sink.

In yet another example embodiment may include an apparatus comprising a processor to decode received video, perform rotation of the received video, and perform aspect ratio scaling of the received video, and a storage coupled to said processor. The apparatus may include said processor to receive a request from a source for a rotation capability. The apparatus may include said processor to respond to the request by indicating whether the sink supports rotation.

Another example embodiment may be one or more non-transitory computer readable media storing instructions to perform a sequence comprising detecting a rotation capable sink, in response to detecting a rotation capable sink, wirelessly transmitting video content in the content's native orientation, and in response to detecting a sink that is not rotation capable, wirelessly transmitting video content in landscape orientation. The media may include wherein detecting includes obtaining a parameter from the sink indicative of whether the sink is rotation capable. The media may include said sequence including detecting using an M3 request. The media may include said sequence including rotating received content and aspect ratio scaling content for display on the source. The media may include said sequence including supporting a rotated wireless sink without notifications or status updates related to the sink's current orientation. The media may include said sequence wherein no rotation or aspect ratio scaling is performed by the source for the sink. The media may include said sequence including refraining from scaling video sent for display on a sink.

In another example embodiment may be one or more non-transitory computer readable media storing instructions to perform a sequence comprising decoding received video, performing rotation of the received video, and performing aspect ratio scaling of the received video. The media may include said sequence including receiving a request from a source for a rotation capability. The media may include said sequence including responding to the request by indicating whether the sink supports rotation.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method of transmitting video wirelessly from a source device, comprising:
   the source device wirelessly transmitting a query of rotation capability to a sink device;
   the source device wirelessly receiving a rotation capability response to the query from the sink device;
   the source device determining, based on the rotation capability response, whether the sink device is display rotation capable in that it can switch between landscape and portrait orientations in response to a physical rotation of the sink device;
   in response to a determination that the sink device is not capable of rotation between the landscape and portrait display modes, the source device wirelessly transmitting video content to the sink device in landscape orientation; and in response to a determination that the sink device is capable of rotation between the landscape and portrait display modes, the source device wirelessly transmitting the video content to the sink device in the content's native orientation without scaling in the source device and only scaling in the sink device.

2. The method of claim 1 wherein the query of rotation capability comprises a real time streaming protocol (RTSP) parameter request.

3. The method of claim 2 wherein the RTSP request comprises an M3 request.

4. The method of claim 1 including rotating received content and aspect ratio scaling content for display on the source device.

5. The method of claim 1 including supporting a rotated wireless sink device without notifications or status updates related to the sink device's current orientation.

6. The method of claim 1 wherein no rotation or aspect ratio scaling is performed by the source device for the sink device.

7. The method of claim 1 including refraining from scaling video sent for display on the sink device.

8. An apparatus that is a source device comprising:
a processor to:
wirelessly transmit a query of rotation capability to a sink device,
receive a rotation capability response to the query from the sink device,
determine, based on the rotation capability response, whether the sink device is display rotation capable in that it can switch between landscape and portrait orientations in response to a physical rotation of the sink device,
in response to a determination that the sink device is not capable of rotation between the landscape and portrait display modes, wirelessly transmit video content to the sink device in landscape orientation, and
in response to a determination that the sink device is capable of rotation between the landscape and portrait display modes, and wirelessly transmit the video content to the sink device in the content's native orientation without scaling in the source device and only scaling in the sink device; and
a transmitter coupled to said processor.

9. The apparatus of claim 8, wherein the query of rotation capability comprises a real time streaming protocol (RTSP) parameter request.

10. The apparatus of claim 9, wherein the RTSP request comprises an M3 request.

11. The apparatus of claim 8, said processor to rotate received content and aspect ratio scaling content for display on the source device.

12. The apparatus of claim 8, said processor to support a rotated wireless sink device without notifications or status updates related to the sink device's current orientation.

13. The apparatus of claim 8 wherein no rotation or aspect ratio scaling is performed by the source device for the sink device.

14. The apparatus of claim 8, said processor to refrain from scaling video sent for display on the sink device.

15. One or more non-transitory computer readable media storing instructions to perform a sequence comprising:
wirelessly transmitting, by a source device, a query of rotation capability to a sink device;
wirelessly receiving, by the source device, a rotation capability response to the query from the sink device;
determining, by the source device, whether the sink device is display rotation capable in that it can switch between landscape and portrait orientations in response to a physical rotation of the sink device;
in response to a determination that the sink device is not capable of rotation between the landscape and portrait display modes, wirelessly transmitting video content to the sink device in landscape orientation; and
in response to a determination that the sink device is capable of rotation between the landscape and portrait display modes, wirelessly transmitting the video content to the sink device in the content's native orientation without scaling in the source device and only scaling in the sink device.

16. The media of claim 15, wherein the query of rotation capability comprises a real time streaming protocol (RTSP) parameter request.

17. The media of claim 16, wherein the RTSP request comprises an M3 request.

18. The media of claim 15, said sequence including rotating received content and aspect ratio scaling content for display on the source device.

19. The media of claim 15, said sequence including supporting a rotated wireless sink device without notifications or status updates related to the sink device's current orientation.

20. The media of claim 15, said sequence wherein no rotation or aspect ratio scaling is performed by the source device for the sink device.

21. The media of claim 15, said sequence including refraining from scaling video sent for display on the sink device.

* * * * *